US012074361B2

(12) United States Patent
Park et al.

(10) Patent No.: US 12,074,361 B2
(45) Date of Patent: Aug. 27, 2024

(54) ELECTRONIC DEVICE COMPRISING ANTENNA

(71) Applicant: SAMSUNG ELECTRONICS CO., LTD., Suwon-si (KR)

(72) Inventors: Seongjin Park, Suwon-si (KR); Kiwon Kim, Suwon-si (KR); Hyunkee Min, Suwon-si (KR); Jaebong Chun, Suwon-si (KR); Ilpyo Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 109 days.

(21) Appl. No.: 17/982,143

(22) Filed: Nov. 7, 2022

(65) Prior Publication Data

US 2023/0061101 A1 Mar. 2, 2023

Related U.S. Application Data

(63) Continuation of application No. PCT/KR2021/005151, filed on Apr. 23, 2021.

(30) Foreign Application Priority Data

May 7, 2020 (KR) ........................ 10-2020-0054528

(51) Int. Cl.
*H01Q 1/24* (2006.01)
*H01Q 1/22* (2006.01)
(Continued)

(52) U.S. Cl.
CPC ............. *H01Q 1/2291* (2013.01); *H01Q 7/00* (2013.01); *H01Q 9/0407* (2013.01); *H01Q 21/08* (2013.01); *H01Q 25/002* (2013.01)

(58) Field of Classification Search
CPC .......... H01Q 1/24; H01Q 1/241; H01Q 1/243; H01Q 1/22; H01Q 1/2291; H01Q 9/0407;
(Continued)

(56) References Cited

U.S. PATENT DOCUMENTS

| | | | |
|---|---|---|---|
| 7,486,235 | B2 | 2/2009 | Leeper et al. |
| 10,135,133 | B2 | 11/2018 | Wu et al. |

(Continued)

FOREIGN PATENT DOCUMENTS

| | | | |
|---|---|---|---|
| CN | 105024137 | A | 11/2015 |
| CN | 107978858 | A | 5/2018 |

(Continued)

OTHER PUBLICATIONS

International Search Report (PCT/ISA/210) issued Aug. 11, 2021 by the International Searching Authority in International Patent Application No. PCT/KR2021/005151.

(Continued)

*Primary Examiner* — Thai Pham
(74) *Attorney, Agent, or Firm* — Sughrue Mion, PLLC

(57) ABSTRACT

An electronic device includes: an electronic device includes: a housing; a first antenna structure provided in an inner space of the housing, the first antenna structure including: a first substrate having a first substrate surface facing a first direction and a second substrate surface facing a second direction opposite to the first direction, the first substrate including a plurality of first insulating layers and a first ground layer disposed on at least one of the plurality of first insulating layers; and a conductive patch disposed on one of the plurality of first insulating layers and overlapping the first ground layer; and a second antenna structure disposed in an opening of the first substrate in the inner space of the housing, the second antenna structure including: a second substrate having a third substrate surface facing the first (Continued)

direction and a fourth substrate surface facing the second direction, the second substrate including a plurality of second insulating layers that are stacked and a second ground layer; and at least two antenna elements disposed on a second insulating layer, among the plurality of second insulating layers, that is closer to the third substrate surface than the fourth substrate surface, wherein the conductive patch at least partly surrounds the second antenna structure.

17 Claims, 14 Drawing Sheets

(51) Int. Cl.

| | |
|---|---|
| ***H01Q 7/00*** | (2006.01) |
| ***H01Q 9/04*** | (2006.01) |
| ***H01Q 21/08*** | (2006.01) |
| ***H01Q 25/00*** | (2006.01) |

(58) Field of Classification Search

CPC ...... H01Q 21/06; H01Q 21/065; H01Q 21/08; H01Q 21/28; H01Q 5/40; H01Q 7/00; H01Q 25/002

See application file for complete search history.

(56) References Cited

U.S. PATENT DOCUMENTS

| | | | | |
|---|---|---|---|---|
| 2009/0146796 | A1 | 6/2009 | Goto et al. | |
| 2012/0235881 | A1 | 9/2012 | Pan et al. | |
| 2015/0091760 | A1* | 4/2015 | Sawa | H01Q 5/385 343/700 MS |
| 2017/0062937 | A1 | 3/2017 | Ganchrow et al. | |
| 2017/0195141 | A1 | 7/2017 | Sanderovich et al. | |
| 2019/0020100 | A1* | 1/2019 | Jong | H01Q 1/48 |
| 2019/0089071 | A1 | 3/2019 | Sudo et al. | |
| 2019/0089419 | A1 | 3/2019 | Kim et al. | |
| 2019/0131691 | A1 | 5/2019 | Hong et al. | |
| 2019/0165472 | A1* | 5/2019 | Yun | H01Q 5/40 |
| 2020/0007193 | A1 | 1/2020 | Han et al. | |
| 2020/0036083 | A1 | 1/2020 | Kim et al. | |
| 2020/0153086 | A1* | 5/2020 | Park | H01Q 9/0407 |
| 2021/0151860 | A1* | 5/2021 | Park | H01Q 21/24 |

FOREIGN PATENT DOCUMENTS

| | | | |
|---|---|---|---|
| CN | 108832287 | A | 11/2018 |
| CN | 209001122 | U | 6/2019 |
| KR | 10-2013-0122688 | A | 11/2013 |
| KR | 10-2018-0025066 | A | 3/2018 |
| KR | 10-2018-0041678 | A | 4/2018 |
| KR | 10-2018-0096280 | A | 8/2018 |
| KR | 10-2018-0098275 | A | 9/2018 |
| KR | 10-2019-0049300 | A | 5/2019 |
| KR | 10-2019-0062064 | A | 6/2019 |
| KR | 10-2019-0083588 | A | 7/2019 |
| KR | 10-2020-0012106 | A | 2/2020 |

OTHER PUBLICATIONS

Written Opinion (PCT/ISA/237) issued Aug. 11, 2021 by the International Searching Authority in International Patent Application No. PCT/KR2021/005151.

* cited by examiner

ELECTRONIC DEVICE COMPRISING ANTENNA

CROSS-REFERENCE TO RELATED APPLICATIONS

This application is a by-pass continuation application of International Application No. PCT/KR2021/005151, filed on Apr. 23, 2021, which based on and claims priority to Korean Patent Application No. 10-2020-0054528, filed on May 7, 2020, in the Korean Intellectual Property Office, the disclosures of which is incorporated by reference herein in their entireties.

BACKGROUND

1. Field

The disclosure relates to an electronic device including an antenna.

2. Description of Related Art

With the development of wireless communication technology, an electronic device (e.g., an electronic device for communication) has been universally used in everyday life, and due to this, the content usage is exponentially increasing. Due to such rapid increase in the content usage, the network capacity has gradually reached its limit, and in order to meet the increasing radio data traffic demand after commercialization of the 4th generation (4G) communication system, the electronic device may include an antenna for a communication system (e.g., 11ay, 5th generation (5G) or pre-5G communication system, or new radio (NR)) which transmits and/or receives a signal by using a high frequency (e.g., millimeter wave (mmWave)) band (e.g., 3 GHz to 300 GHz band) frequency. Further, the electronic device may include an antenna for short-range communication.

A short-range wireless communication can make a quick connection by being applied to an electronic device for short-range communication (e.g., a dongle) for connecting a first external electronic device (e.g., TV) and a second external electronic device (e.g., a portable communication device such as a smart phone) with each other. The electronic device for the short-range communication may include an antenna provided therein to operate in a high frequency band, and may be configured to form a beam pattern toward a specific direction. For example, the short-range communication may include "802.11ay" that is one of Local Area Network (LAN) schemes proposed by the wireless LAN (WLAN) IEEE 802.11 group. Since the 802.11ay uses a relatively wider bandwidth (about 8.64 GHz) than the bandwidth of other short-range communications in the high frequency band (e.g., about 60 GHz), it is being developed as the next-generation short-range wireless communication.

However, due to a narrow beam width, the electronic device for the short-range communication including the antenna using the high frequency may cause a delay time for searching to occur when being connected with an external electronic device (e.g., a portable communication device), and thus, may use an antenna having another frequency band having a relatively wide beam width to supplement the delay time. For example, for quick searching for peripheral external devices, the electronic device for the short-range communication may include a first antenna structure operating in a first frequency band (e.g., a legacy band) so as to have a relatively wide beam width and a second antenna structure operating in a second frequency band (e.g., mmWave) for the quick data communication after being connected to a designated external electronic device. As another example, the electronic device may adopt a layout structure for radiation of antennas operating in different frequencies in designated directions.

SUMMARY

Provided is an electronic device including an antenna.

Further, provided is an electronic device including an antenna, which can be quickly connected to an external device through antennas operating in different frequency bands.

According to an aspect of the disclosure, an electronic device includes: a housing; a first antenna structure provided in an inner space of the housing, the first antenna structure including: a first substrate having a first substrate surface facing a first direction and a second substrate surface facing a second direction opposite to the first direction, the first substrate including a plurality of first insulating layers and a first ground layer disposed on at least one of the plurality of first insulating layers; and a conductive patch disposed on one of the plurality of first insulating layers and overlapping the first ground layer; and a second antenna structure disposed in an opening of the first substrate in the inner space of the housing, the second antenna structure including: a second substrate having a third substrate surface facing the first direction and a fourth substrate surface facing the second direction, the second substrate including a plurality of second insulating layers that are stacked and a second ground layer; and at least two antenna elements disposed on a second insulating layer, among the plurality of second insulating layers, that is closer to the third substrate surface than the fourth substrate surface, wherein the conductive patch at least partly surrounds the second antenna structure.

The electronic device may further include a first wireless communication circuit disposed in the inner space of the housing and configured to transmit or receive a radio signal of a first frequency band through the conductive patch; and a second wireless communication circuit is disposed in the inner space and is configured to transmit or receive a radio signal of a second frequency band through the at least two antenna elements, wherein a beam coverage of the first antenna structure and a beam coverage of the second antenna structure overlap each other at least partly.

The second frequency band may be higher than the first frequency band.

The first frequency band may be in a range of 600 MHz to 6000 MHz.

The second frequency band may be equal to or higher than 6 GHz.

The conductive patch may not overlap the at least two antenna elements.

The at least two antenna elements may be surrounded in a loop shape by the conductive patch.

The first wireless communication circuit may be disposed on the second substrate surface, and the second wireless communication circuit may be disposed on the second substrate surface or the fourth substrate surface.

A first beam coverage of the first antenna structure may include a second beam coverage of the second antenna structure.

The opening of the first substrate may be at least partly surrounded by the conductive patch.

According to an aspect of the disclosure, an electronic device includes: a housing; a substrate disposed in an inner space of the housing, the substrate including: a plurality of insulating layers that are stacked, and a ground layer disposed on at least one of the plurality of insulating layers; a patch antenna overlapping the ground layer and disposed on a first insulating layer among the plurality of insulating layers; and an array antenna overlapping the ground layer and disposed on an insulating layer among the plurality of insulating layers, wherein the array antenna is surrounded in a loop form by the patch antenna.

The electronic device may further include: a first wireless communication circuit disposed in the inner space and configured to transmit or receive a radio signal of a first frequency band through the patch antenna; and a second wireless communication circuit disposed in the inner space and configured to transmit or receive a radio signal of a second frequency band through the array antenna, and a beam coverage of the patch antenna and a beam coverage of the array antenna may at least partly overlap each other.

The second frequency band may be to be higher than the first frequency band.

The first frequency band may be in a range of 600 MHz to 6000 MHz.

The second frequency band may be equal to or higher than 6 GHz.

The array antenna may be disposed on the first insulating layer.

The array antenna may be disposed on an insulating layer, among the plurality of insulating layers, that is closer to the ground layer than the first insulating layer, or on an insulating layer, among the plurality of insulating layers, that is farther from the ground layer than the first insulating layer.

The electronic device according to one or more embodiments of the disclosure can be quickly connected to an external electronic device through antennas having beam coverages overlapping each other at least partly and having different beam widths, and the different antennas can be efficiently disposed.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
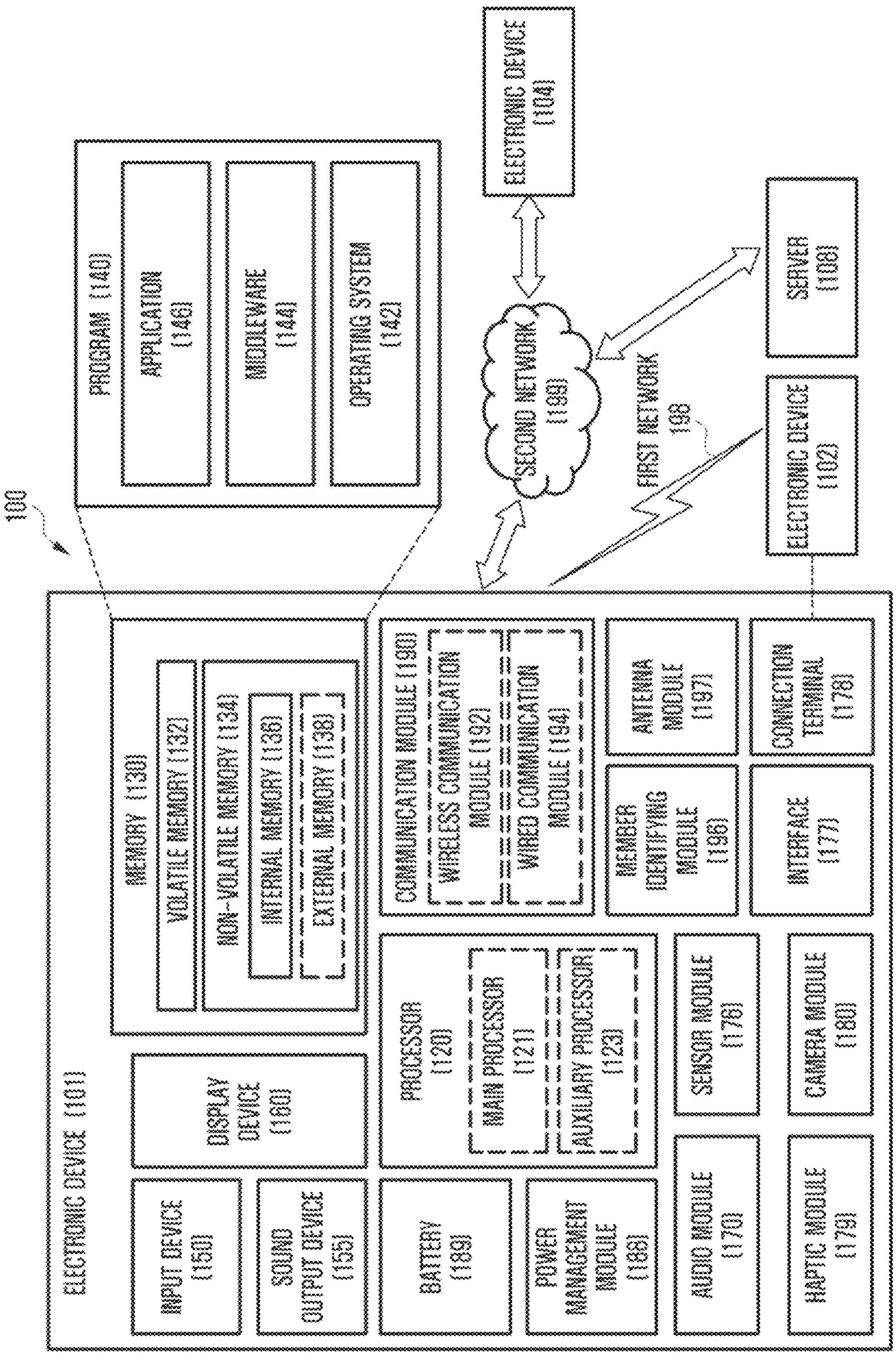
FIG. 1 is a block diagram of an electronic device in a network environment according to various embodiments of the disclosure.

FIG. 1 illustrates an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identity module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a PCB). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to an embodiment may be one of various types of electronic devices. The electronic device may include a portable communication device (e.g., a smart phone), a computer device, a portable multimedia device, a portable medical device, a camera, a wearable device, or a home appliance. However, the electronic device is not limited to any of those described above.

Certain embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, The module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
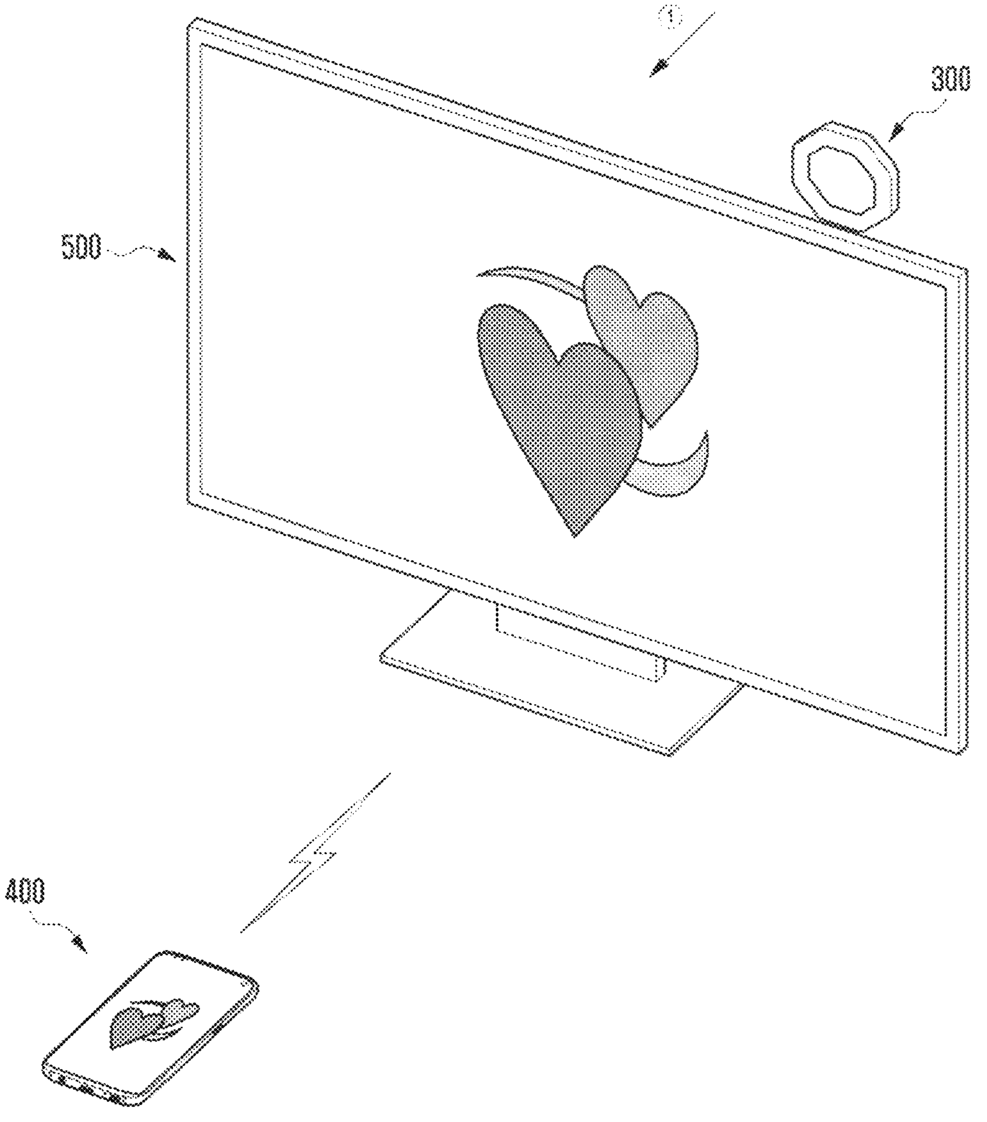
FIG. 2 is a schematic diagram illustrating connection structures between an electronic device according to various embodiments of the disclosure and external electronic devices.

FIG. 2 is a schematic diagram illustrating connection structures between an electronic device 300 according to various embodiments of the disclosure and external electronic devices 400 and 500.

The electronic device 300 of FIG. 2 may be at least partly similar to the electronic device 101 of FIG. 1, or may further include other embodiments of the electronic device. In a certain embodiment, the first external electronic device 400 and/or the second external electronic device 500 of FIG. 2 may be at least partly similar to the electronic device 101 of FIG. 1, or may further include other embodiments of the electronic device.

With reference to FIG. 2, the electronic device 300 may be used as an electronic device for data transfer (e.g., a dongle) of the first external electronic device 400 and the second external electronic device 500. In a certain embodiment, the electronic device 300 may be used as an electronic device (e.g., a small base station) that performs wireless communication with the first external electronic device 400 and the second external electronic device 500. According to an embodiment, the electronic device 300 may receive data from the first external electronic device 400, and may transfer the received data to the second external electronic device 500 in real time. For example, the electronic device 300 may be provided with various kinds of configuration information of the first external electronic device 400 through first wireless communication, and may transfer the data provided from the first external electronic device 400 to the second external electronic device 500 through second wireless communication. For example, through the first wireless communication, the electronic device 300 may be provided from the first external electronic device 400 with configuration information including at least one of short-range communication information, capability information, location information, identification information (e.g., a name), an attribute (e.g., a type or specification), state information (e.g., on/off), battery level information, communication strength information, and communication protocol type information. According to an embodiment, the first wireless communication may be performed in the frequency band (e.g., a legacy band), for example, in the range of 600 MHz to 6000 MHz. According to an embodiment, the first wireless communication may include Bluetooth communication. According to an embodiment, the second wireless communication may be performed in the frequency band (e.g., mmWave band) of at least 6 GHz. According to an embodiment, the second wireless communication may include 802.11ay communication that operates in the frequency band of about 60 GHz.

According to various embodiments, the electronic device 300 may be configured to communicate with the first external electronic device 400 through the first wireless communication and the second wireless communication having beam patterns formed in an at least partly overlapping coverage direction (direction ①). For example, the electronic device 300 may include a first antenna structure (e.g., first antenna structure 310 of FIG. 3) corresponding to the first wireless communication and a second antenna structure (e.g., second antenna structure 320 of FIG. 3) corresponding to the second wireless communication, and may have an efficient layout structure for forming beam patterns in the at least partly overlapping coverage direction.

Figure 3:
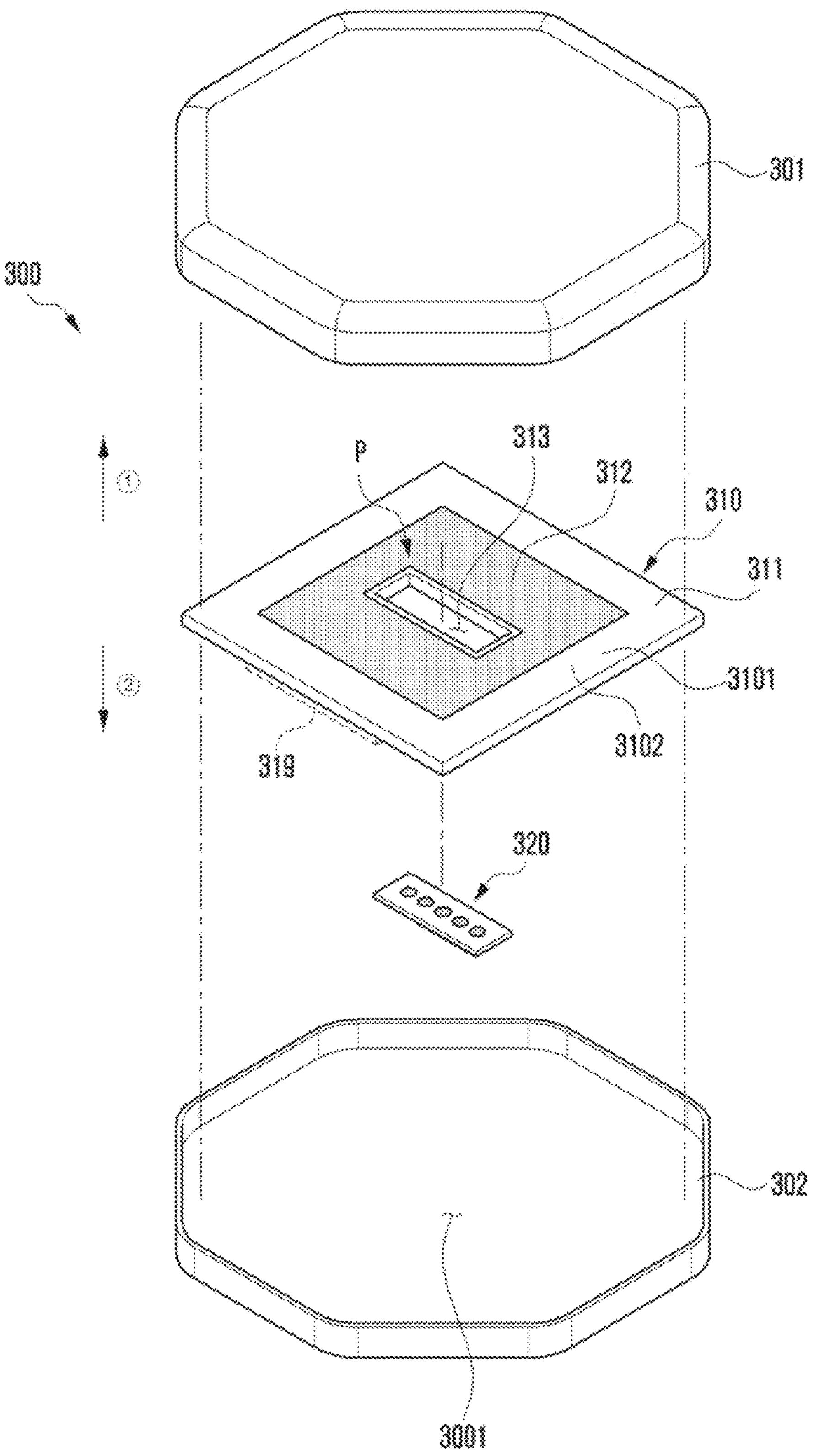
FIG. 3 is an exploded perspective view of an electronic device according to various embodiments of the disclosure.
Figure 4:
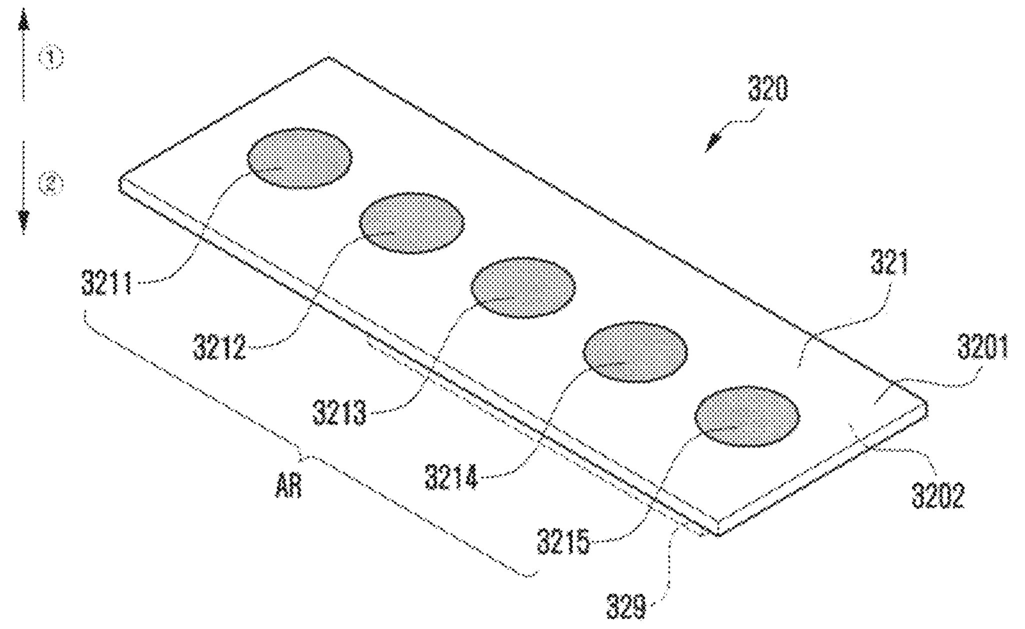
FIG. 4 is a perspective view illustrating the constitution of a second antenna structure according to various embodiments of the disclosure.

FIG. 3 is an exploded perspective view of an electronic device 300 according to various embodiments of the disclosure. FIG. 4 is a perspective view illustrating the constitution of a second antenna structure 320 according to various embodiments of the disclosure.

With reference to FIG. 3, the electronic device 300 may include a first housing 301 (e.g., front cover or first case frame), a second housing 302 (e.g., rear cover or second case frame) combined with the first housing 301, and antenna structures 310 and 320 disposed in an inner space 3001 between the first housing 301 and the second housing 302. According to an embodiment, the antenna structures 310 and 320 may include the first antenna structure 310 and the second antenna structure 320 disposed adjacent to the first antenna structure 310. For example, the second antenna structure 320 is disposed in an opening 313 of the first antenna structure 310. For example, when the first housing 301 is viewed from above, an area in which the first antenna structure 310 is disposed may at least partly overlap an area in which the second antenna structure 320 is disposed.

According to various embodiments, the first antenna structure 310 may include a first substrate 311 and a conductive patch 312 disposed on the first substrate 311. According to an embodiment, the conductive patch 312 may operate as a patch antenna P. According to an embodiment, the first substrate 311 may include a first substrate surface 3101 facing a first direction (direction ①) in which the first housing 301 is viewed and a second substrate surface 3102 facing a second direction (direction ②) that is opposite to the first substrate surface 3101.

According to an embodiment, the first substrate 311 may include an opening 313 disposed to be surrounded by the conductive patch 312 when the first substrate surface 3101 is viewed from above. According to an embodiment, the opening 313 may be surrounded in a loop form by the conductive patch 312. In a certain embodiment, the opening 313 may be replaced by a recess formed in the second direction (direction ②) in the first substrate surface 3101. According to an embodiment, the first substrate 311 may include a first wireless communication circuit 319 disposed on the second substrate surface 3102 and electrically connected through the first substrate 311. According to an embodiment, the first wireless communication circuit 319 may be configured to transmit and/or receive a radio signal in the frequency range (e.g., legacy band) of about 600 MHz to 6000 MHz through the patch antenna P formed of the conductive patch 312.

With reference to FIG. 4, the electronic device 300 may include the second antenna structure 320 disposed in the opening 313 of the first substrate 311. According to an embodiment, the second antenna structure 320 may be surrounded in a loop form by at least a part of the conductive patch 312 when the first substrate surface 3101 is viewed from above (e.g., when the first substrate surface 3101 is viewed in the first direction (direction ①). According to an embodiment, the second antenna structure 320 may include a second substrate 321 disposed to at least partly overlap the opening 313 of the first substrate 311, and a plurality of antenna elements 3211, 3212, 3213, 3214, and 3215 disposed on the second substrate 321 when the first substrate surface 3101 is viewed from above. According to an embodiment, the second substrate 321 may include a third substrate surface 3201 facing the first direction (direction ①) and a fourth substrate surface 3202 facing the second direction (direction ①) that is opposite to the third substrate surface 3201. According to an embodiment, the plurality of antenna elements 3211, 3212, 3213, 3214, and 3215 may include a first antenna element 3211, a second antenna element 3212, a third antenna element 3213, a fourth antenna element 3214, and/or a fifth antenna element 3215 that are disposed at designated intervals on the third substrate surface 3201 of the second substrate 321 or at a location that is closer to the third substrate surface 3201 than the fourth substrate surface 3202 of the second substrate 321. According to an embodiment, the plurality of antenna elements 3211, 3212, 3213, 3214, and 3215 may operate as an array antenna AR. In a certain embodiment, the second antenna structure 320 may operate through at least one of the plurality of antenna elements 3211, 3212, 3213, 3214, and 3215. According to an embodiment, the plurality of antenna elements 3211, 3212, 3213, 3214, and 3215 may include a conductive patch and/or a conductive pattern formed on the second substrate 321. According to an embodiment, the second substrate 321 may include a second wireless communication circuit 329 disposed on the fourth substrate surface 3202. According to an embodiment, the second wireless communication circuit 329 may be configured to transmit and/or receive a radio signal in a frequency range (e.g., mmWave band) of about 6 GHz or more through the array antenna AR including the plurality of antenna elements 3211, 3212, 3213, 3214, and 3215. In a certain embodiment, the second wireless communication circuit 329 may be disposed on the first substrate 311 together with the first wireless communication circuit 319. In a certain embodiment, the first wireless communication circuit 319 and/or the second wireless communication circuit 329 may be disposed on another printed circuit board (e.g., main substrate) disposed in the inner space 3001 of the electronic device 300, other than the first substrate 311 and the second substrate 321, and may be electrically connected to the first substrate 311 and the second substrate 321 through an electrical connection member 330 (e.g., Flexible Printed Circuit Board (FPCB)). In a certain embodiment, when the first housing 301 is viewed from above, the patch antenna P of the first antenna structure 310 may be disposed to at least partly overlap the array antenna AR of the second antenna structure 320.

According to various embodiments, since the patch antenna P of the first antenna structure 310 and the array antenna AR of the second antenna structure 320 operate in different frequency bands, and are disposed to form beam patterns in a coverage direction in which they overlap each other at least partly, they can facilitate fast and efficient connection with an external electronic device (e.g., first external electronic device 400 of FIG. 2). As another example, since the conductive patch 312 of the first antenna structure 310 is disposed to at least partly surround the second antenna structure 320 in the loop shape, the antenna layout space can be reduced.

Figure 5:
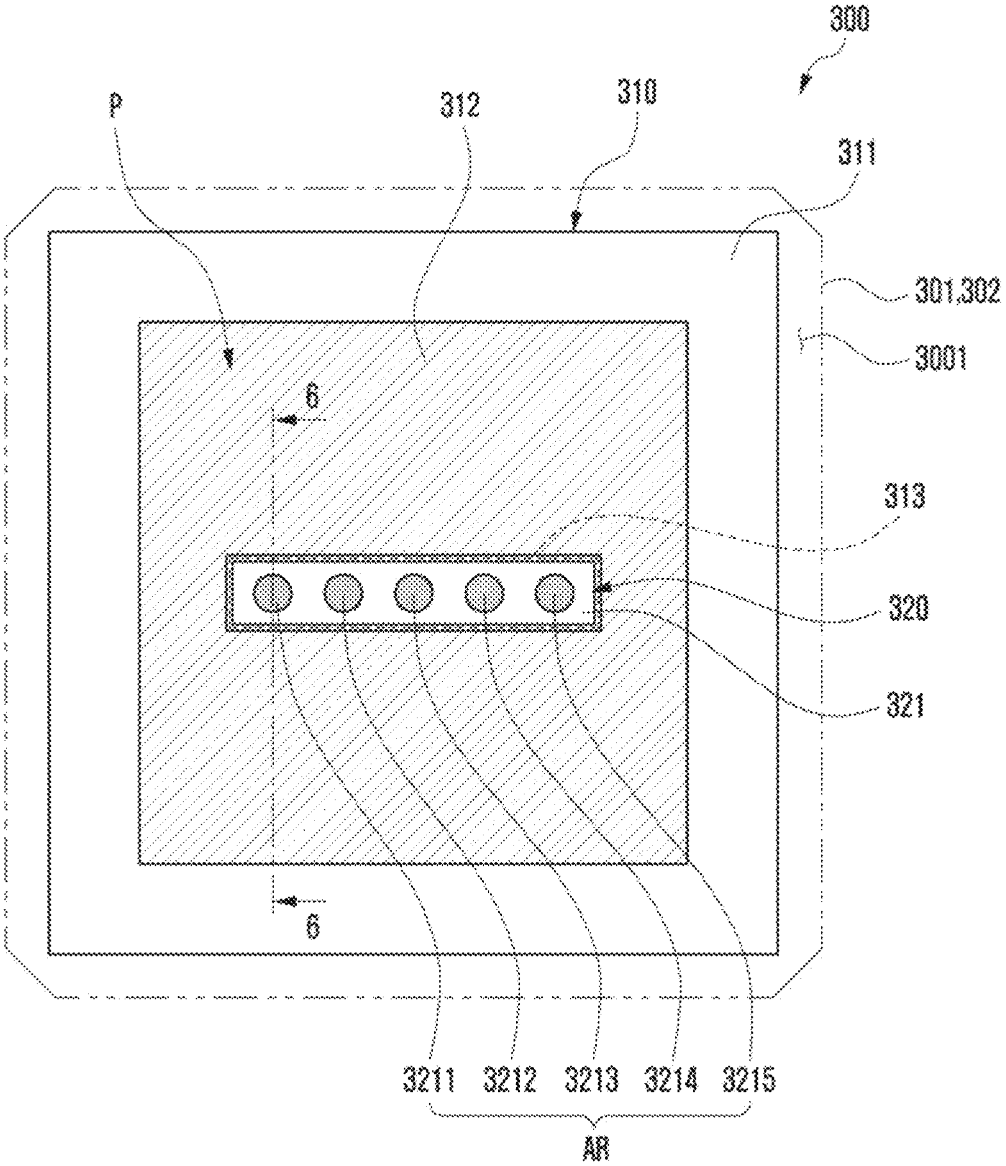
FIG. 5 is a view illustrating a layout structure of a first antenna structure and a second antenna structure according to various embodiments of the disclosure.
Figure 6:
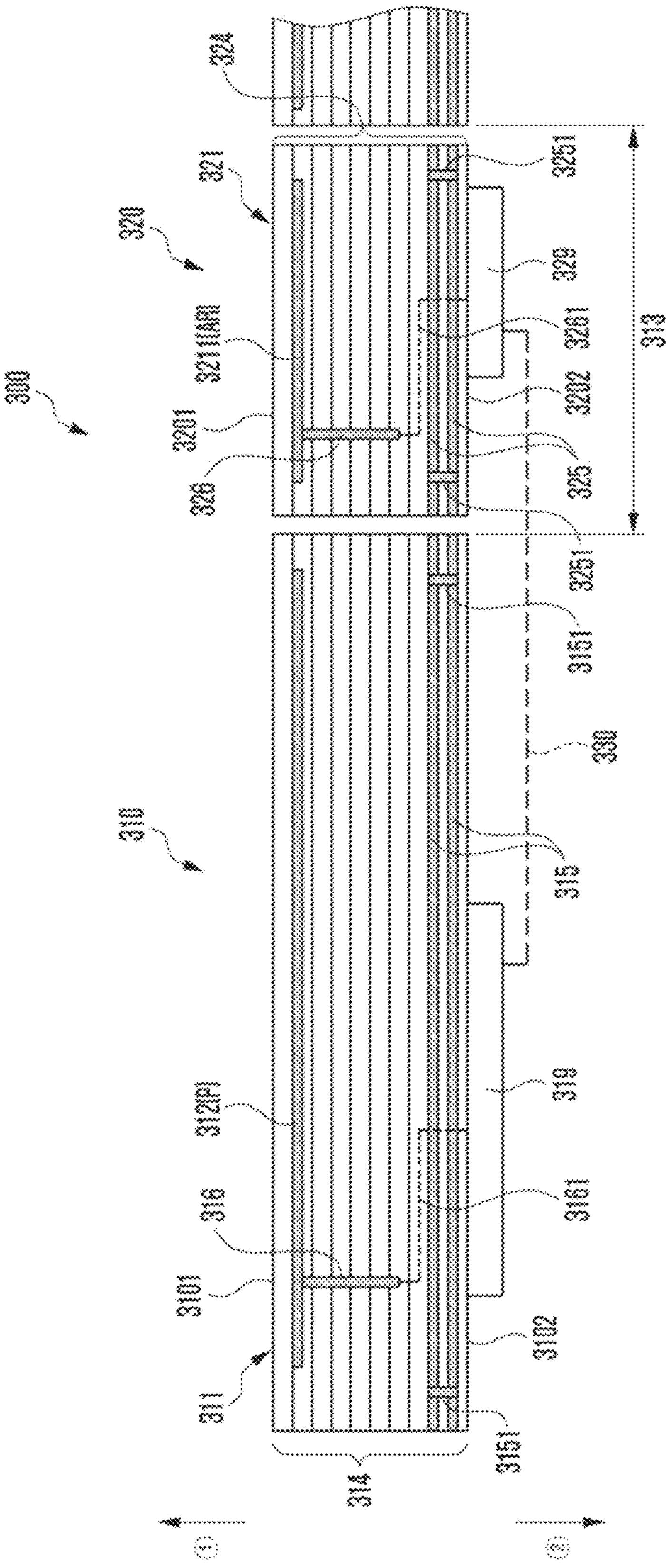
FIG. 6 is a partial cross-sectional view of an electronic device viewed from line 6-6 of FIG. 5 according to various embodiments of the disclosure.

FIG. 5 is a view illustrating a layout structure of a first antenna structure 310 and a second antenna structure 320 according to various embodiments of the disclosure. FIG. 6 is a partial cross-sectional view of an electronic device 300 viewed from line 6-6 of FIG. 5 according to various embodiments of the disclosure.

With reference to FIGS. 5 and 6, the electronic device 300 may include the first antenna structure 310 disposed in the inner space 3001 of the housings 301 and 302, and the second antenna structure 320 disposed to be at least partly surrounded through the conductive patch 312 of the first antenna structure 310 around the first antenna structure 310. According to an embodiment, the first antenna structure 310 may include the conductive patch 312 disposed on the first substrate 311 including the opening 313. According to an embodiment, the second antenna structure 320 may be at least partly surrounded by the conductive patch 312. According to an embodiment, the first substrate 311 may include a plurality of first insulating layers 314, and may include a first ground layer 315 disposed on at least one of the plurality of first insulating layers 314. According to an embodiment, in case that the first ground layers 315 are respectively disposed on at least two insulating layers, the first ground layers 315 may be electrically connected to each other through at least one first conductive via 3151. According to an embodiment, the conductive patch 312 may be disposed on an insulating layer that is closer to the first substrate surface 3101 than the first ground layer 315 at the location where it overlaps the first ground layer 315 when the first substrate surface 3101 is viewed from above. According to an embodiment, the conductive patch 312 may be disposed in the loop (e.g., closed-loop) form that surrounds the opening 313, and may be electrically connected to the first feeder part 316 and the first wireless communication circuit 319 disposed on the second substrate surface 3102 of the first substrate 311 through the first electrical wiring 3161.

According to various embodiments, the second antenna structure 320 may include the second substrate 321 disposed in the opening 313 of the first substrate 311, and the plurality of antenna elements (e.g., plurality of antenna elements 3211, 3212, 3213, 3214, and 3215 of FIG. 4) disposed in or on the second substrate 321. As another embodiment, at least a part of the second substrate 321 may be disposed to overlap the opening 313 of the first substrate 311 when the first substrate surface 3101 is viewed from above. For example, the plurality of antenna elements 3211, 3212, 3213, 3214, and 3215 disposed in or on the second substrate 321 may be disposed to overlap the opening 313 of the first substrate 311 when the first substrate surface 3101 is viewed from above. Although only the first antenna element 3211 is illustrated in the cross-sectional view illustrated in FIG. 6, the array antenna (e.g., array antenna AR of FIG. 4) including the second antenna element 3212, the third antenna element 3213, the fourth antenna element 3214, and/or the fifth antenna element 3215 may be included. According to an embodiment, the second substrate 321 may include a plurality of second insulating layers 324, and a second ground layer 325 disposed on at least one of the plurality of second insulating layers 324. According to an embodiment, in case that at least two second ground layers 325 are respectively disposed on at least two insulating layers, the second ground layers 325 may be electrically connected to each other through at least one second conductive via 3215. According to an embodiment, the antenna element 3211 may be disposed on the insulating layer that is closer to the third substrate surface 3201 than the fourth substrate surface 3202 at the location that overlaps the second ground layer 325 when the third substrate surface 3201 is viewed from above. According to an embodiment, the antenna element 3211 may be disposed to be at least partly surrounded through the conductive patch 312 when the third substrate surface is viewed from above, and may be electrically connected to the second wireless communication circuit 329 disposed on the fourth substrate surface 3202 of the second substrate 320 through a second feeder part 326 and a second electrical wiring 3261. In a certain embodiment, the first substrate 311 and the second substrate 321 may be formed to have different thicknesses. For example, the second substrate 321 may be formed thinner than the first substrate 311, and when the substrates 311 and 321 are viewed from above, the third substrate surface 3201 of the second substrate 321 may match with the first substrate surface 3101 of the first substrate 311, or may be disposed at the location that is the same as or higher or lower than the first substrate surface 3101 of the first substrate 311.

According to various embodiments, the electronic device 300 may include the first wireless communication circuit 319 disposed on the second substrate surface 3102 of the first substrate 311 or the second wireless communication circuit 329 disposed on the fourth substrate surface 3202 of the second substrate 321. According to an embodiment, the first wireless communication circuit 319 and the second wireless communication circuit 329 may be electrically connected to each other through the electrical connection member 330 (e.g., FPCB). In a certain embodiment, the first ground layer 315 of the first substrate 311 and the second ground layer 325 of the second substrate 321 may be electrically connected to each other through the electrical connection member (e.g., FPCB).

According to various embodiments, the patch antenna P of the first antenna structure 310 may form the beam pattern directed in the first direction (direction ①) through the first wireless communication circuit 319. According to an embodiment, the array antenna AR of the second antenna structure 320 may also form the beam pattern directed in the first direction (direction ①) through the second wireless communication circuit 329. Accordingly, the electronic device 300 may be configured to transmit and/or receive the radio signal through the external electronic device (e.g., first external electronic device 400 of FIG. 2) located in the first direction (direction ①), the patch antenna P of the first antenna structure 310, and/or the array antenna AR of the second antenna structure 320. For example, the electronic device 300 may start a communication protocol after searching for the external electronic device (e.g., first external electronic device 400 of FIG. 2) through a first wireless communication method (e.g., Bluetooth communication method) through the patch antenna P of the first antenna structure 310, and may transmit and receive data to and from the external electronic device (e.g., first external electronic device 400 of FIG. 2) through a second wireless communication method (e.g., 802.11ay communication method) through the array antenna AR of the second antenna structure 320.

Figure 7:
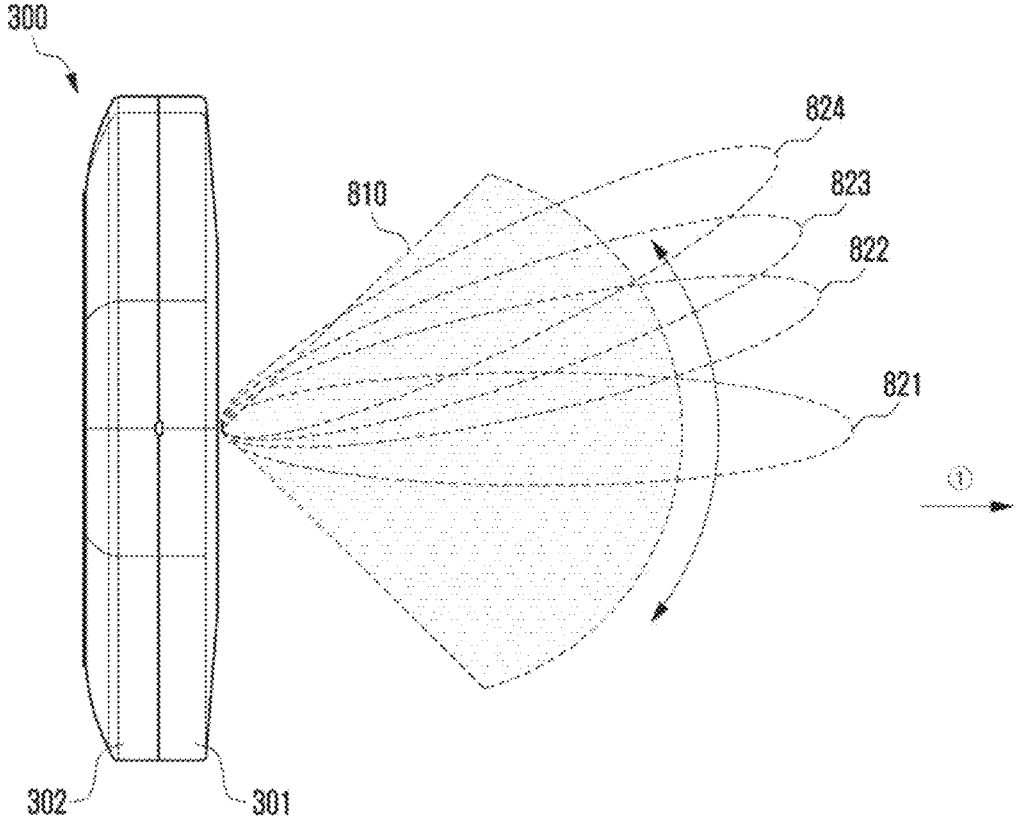
FIG. 7 is a diagram explaining comparison of beam pattern directions with each other through a first antenna structure and a second antenna structure according to various embodiments of the disclosure.

FIG. 7 is a diagram explaining comparison of beam pattern directions with each other through a first antenna structure 310 and a second antenna structure 320 according to various embodiments of the disclosure.

With reference to FIG. 7, an effective beam width 810 (e.g., half power beam width or beam coverage) of the first antenna structure (e.g., first antenna structure 310 of FIG. 6) may be configured to include a beam width 821 in a boresight direction of the second antenna structure (e.g., second antenna structure 320 of FIG. 6), and to include beam widths 822, 823, and 824 tilted at various angles. For example, it may mean that the electronic device (e.g., electronic device 300 of FIG. 6) may perform fast data transmission and/or reception in the high frequency band through the second antenna structure (e.g., second antenna structure 320 of FIG. 6) after searching for the external electronic device (e.g., first external electronic device 400 of FIG. 2) through the first antenna structure (e.g., first antenna structure 310 of FIG. 6) having a relatively wide beam width.

Figure 8:
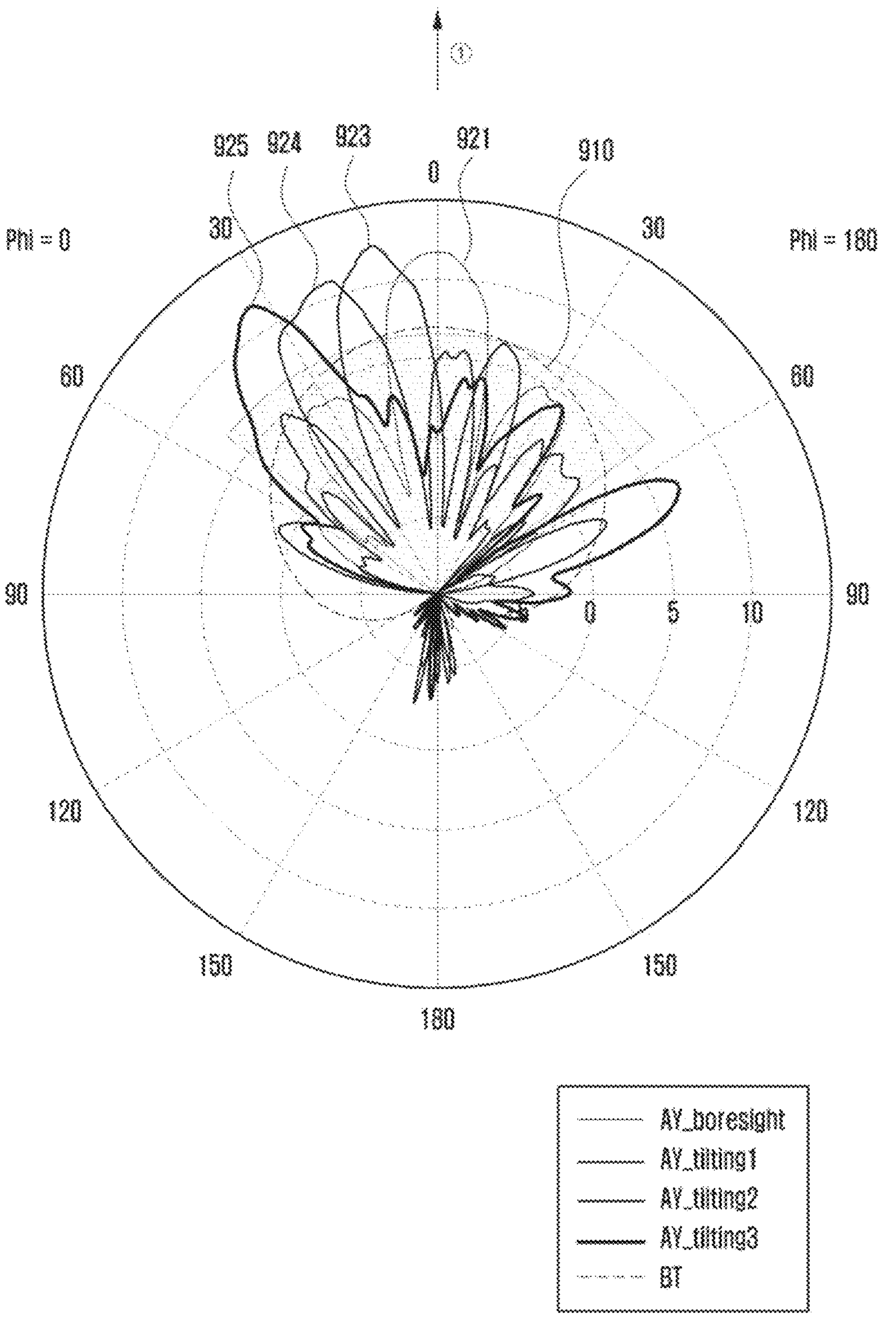
FIG. 8 is a radiation pattern diagram explaining comparison of beam patterns of a first antenna structure and a second antenna structure with each other according to various embodiments of the disclosure.

FIG. 8 is a radiation pattern diagram explaining comparison of beam patterns of a first antenna structure 310 and a second antenna structure 320 with each other according to various embodiments of the disclosure.

With reference to FIG. 8, a radiation pattern 910 of the first antenna structure (e.g., first antenna structure 310 of FIG. 6) may be configured to include a radiation pattern 921 in the boresight direction of the second antenna structure (e.g., second antenna structure 320 of FIG. 6), and to include radiation patterns 922, 923, 924, and 925 tilted at various angles. For example, it may mean that the electronic device (e.g., electronic device 300 of FIG. 6) may perform fast data transmission and/or reception in the high frequency band through the second antenna structure (e.g., second antenna structure 320 of FIG. 6) after searching for the external electronic device (e.g., first external electronic device 400 of FIG. 2) through the first antenna structure (e.g., first antenna structure 310 of FIG. 6) having the radiation pattern of a relatively wide bandwidth.

Figure 9A:
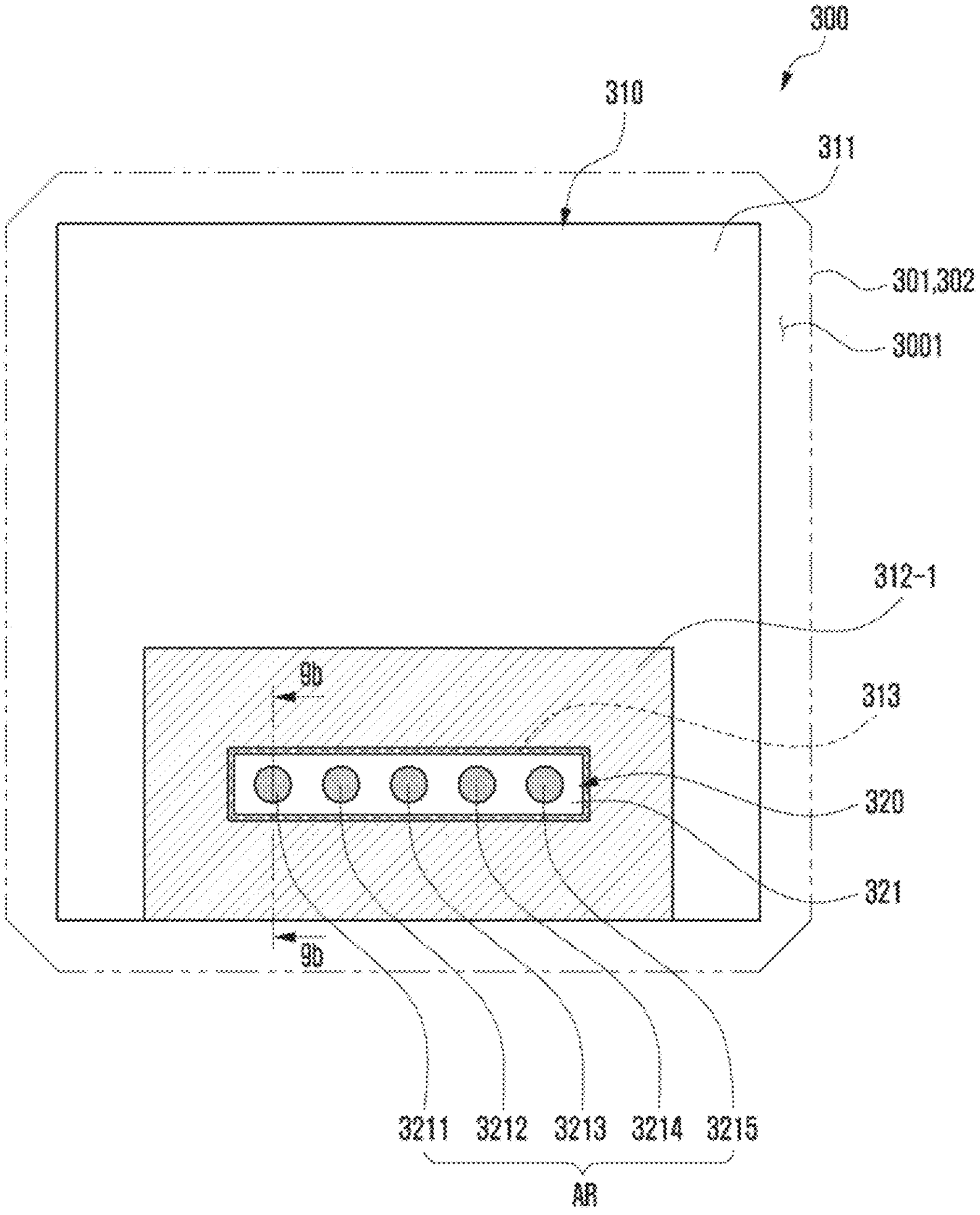
FIG. 9A is a view illustrating a layout structure of a first antenna structure and a second antenna structure according to various embodiments of the disclosure.
Figure 9B:
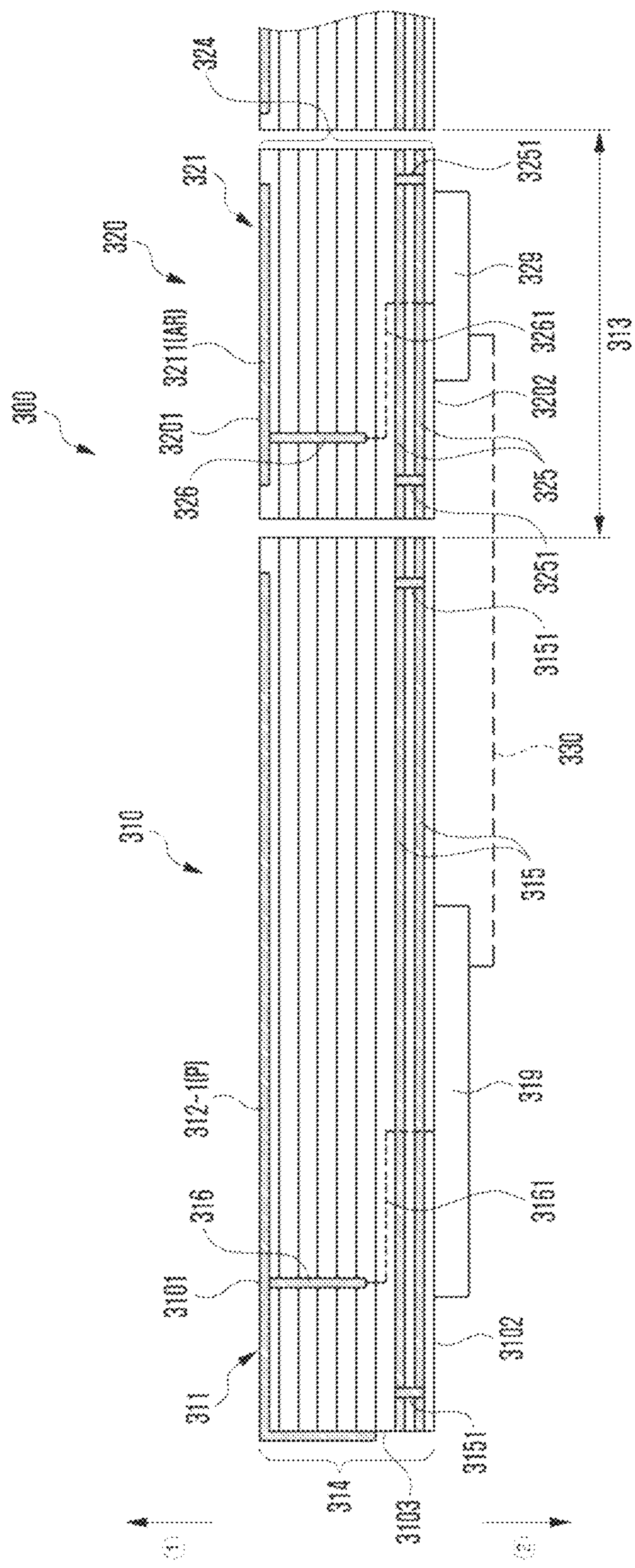
FIG. 9B is a partial cross-sectional view of an electronic device as viewed from line **9*b*-9*b* of FIG. 9A according to various embodiments of the disclosure.

FIG. 9A is a view illustrating a layout structure of a first antenna structure 310 and a second antenna structure 320 according to various embodiments of the disclosure. FIG. 9B is a partial cross-sectional view of the electronic device 300 viewed from line **9*b*-9*b* of FIG. 9**A according to various embodiments of the disclosure.

In explaining FIGS. 9A and 9B, the same reference numerals are given to substantially the same constituent elements as the constituent elements of the electronic device 300 illustrated in FIGS. 5 and 6, and the detailed explanation thereof may be omitted.

With reference to FIGS. 9A and 9B, the first antenna structure 310 may include a conductive patch 312-1 disposed in a half-patch type in consideration of the size of the electronic device 300 and/or the layout location of peripheral electrical elements on the first substrate 311. According to an embodiment, the conductive patch 312-1 may be disposed at any one edge of the first substrate 311 in the area in which the conductive patch 312-1 overlaps the first ground layer 315 when the first substrate surface 3101 is viewed from above. In an embodiment, the conductive patch 312-1 may be disposed to at least partly surround the second antenna structure 320 and to extend up to a substrate side surface 3103 of the first substrate 311 when the first substrate surface 3101 is viewed from above. In an embodiment, the second antenna structure 320 may be disposed in the opening 313. In a certain embodiment, the second antenna structure 320 may be disposed above the first substrate surface 3101 or under the second substrate surface 3102 at the location where the second antenna structure 320 overlaps the opening 313 at least partly when the first substrate surface 3101 is viewed from above. In a certain embodiment, the second antenna structure 320 may be disposed in the opening 313 to project from the first substrate surface 3101 at least partly or to project from the second substrate surface 3102 at least partly. In a certain embodiment, the second antenna structure 320 may be disposed in the opening 313 to have the second substrate 321 that is thinner or thicker than the first substrate 311.

FIGS. 10A to 10D are partial cross-sectional views of an electronic device 600 illustrating a layout structure of a patch antenna 612 and the array antenna AR according to various embodiments of the disclosure.

The electronic device 600 of FIGS. 10A to 10D may be at least partly similar to the electronic device 101 of FIG. 1 or the electronic device 300 of FIG. 2, or may further include other embodiments of electronic devices.

Figure 10A:
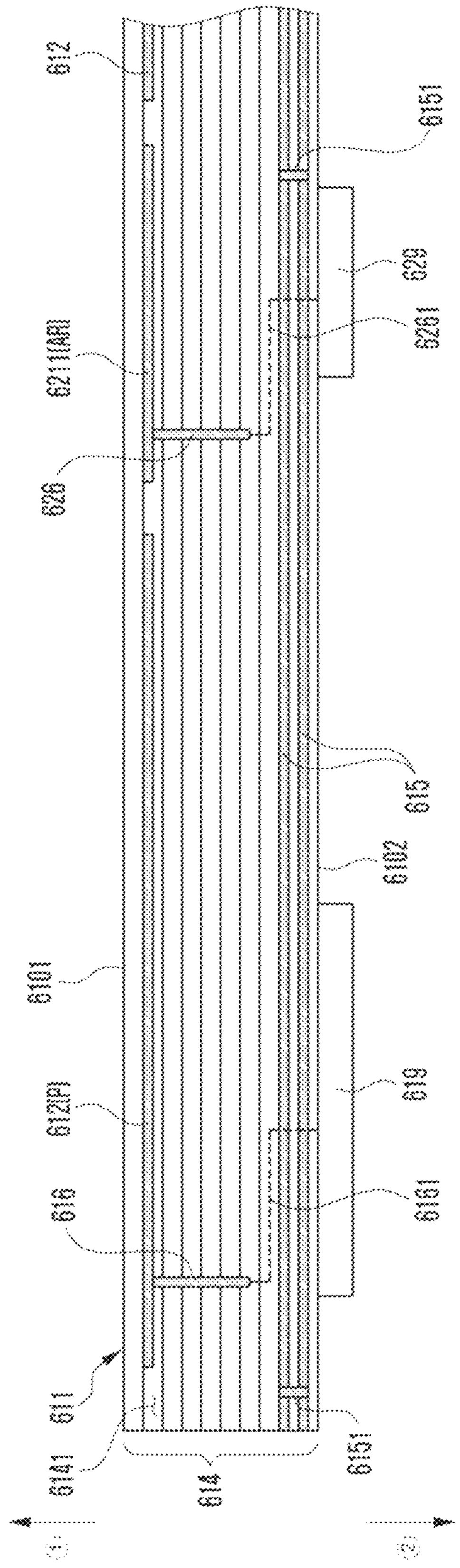
FIGS. 10A to 10**D are partial cross-sectional views of an electronic device illustrating a layout structure of a patch antenna and an array antenna according to various embodiments of the disclosure.

With reference to FIG. 10A, the electronic device 600 (e.g., electronic device 300 of FIG. 6) may include a substrate 611 disposed in an inner space (e.g., inner space 3001 of FIG. 5) of a housing (e.g., housing 301 and 302 of FIG. 5), a patch antenna P (e.g., patch antenna P of FIG. 6) disposed on the substrate 611, and an array antenna AR (e.g., second antenna structure 320 of FIG. 6) disposed around the patch antenna P. According to an embodiment, the substrate 611 may include a first substrate surface 6101 facing a first direction (direction ①), and a second substrate surface 6102 facing a second direction (direction ②) that is opposite to the first direction (direction ①). According to an embodiment, the substrate 611 may include a plurality of insulating layers 614. The substrate 611 may include a ground layer 615 disposed on at least one of the plurality of insulating layers 614. According to an embodiment, in case that the ground layer 615 is disposed on each of at least two insulating layers, they may be electrically connected through at least one conductive via 6151. According to an embodiment, the conductive patch 612 may be disposed on the first insulating layer 6141 that is closer to the first substrate surface 6101 than the second substrate surface 6102 at the location where the conductive patch 612 overlaps the ground layer 615 when the first substrate surface is viewed from above. According to an embodiment, the patch antenna P may include a conductive patch 612 formed on or in the first insulating layer 6141. According to an embodiment, the conductive patch 612 may be electrically connected to a first wireless communication circuit 619 disposed on the second substrate surface 6102 of the substrate 611 through a first feeder part 616 and a first electrical wire 6161.

According to various embodiments, although the array antenna AR is illustrated as one antenna element 6211 (e.g., first antenna element 3211 of FIG. 4), as illustrated in FIG. 4, the array antenna AR may include a plurality of antenna elements (e.g., plurality of antenna elements 3211, 3212, 3213, 3214, and 3215 of FIG. 4) disposed at designated intervals on any one of the plurality of insulating layers 614 of the substrate 611 at the location where the array antenna AR overlaps the ground layer 615 when the first substrate surface 6101 is viewed from above. According to an embodiment, the array antenna AR may be disposed to be at least partly surrounded through the conductive patch 612 when the first substrate surface 6101 is viewed from above. According to an embodiment, the antenna element 6211 of the array antenna AR may be formed of a conductive patch and/or conductive pattern. According to an embodiment, the array antenna AR may be electrically connected to the second wireless communication circuit 629 disposed on the second substrate surface 6102 of the substrate 611 through the second feeder part 616 and the second electrical wiring 3261. According to an embodiment, the patch antenna 612 and the array antenna AR1 may be disposed not to overlap each other when the first substrate surface 6101 is viewed from above.

According to various embodiments, the first wireless communication circuit 619 and/or the second wireless communication circuit 629 may be disposed on the second substrate surface 6102. In a certain embodiment, the first wireless communication circuit 619 and/or the second wireless communication circuit 629 may be disposed on another printed circuit board disposed in the inner space (e.g., inner space 3001 of FIG. 5) of the electronic device 600, and may be electrically connected to the substrate 611 through an electrical connection member (e.g., FPCB).

According to various embodiments, the patch antenna P including the conductive patch 612 may form the beam pattern directed in the first direction (direction ①) through the first wireless communication circuit 619. According to an embodiment, the array antenna AR may form the beam pattern directed in the first direction (direction ①) through the second wireless communication circuit 629. According to an embodiment, the electronic device 600 may be configured to transmit and/or receive the radio signal through the external electronic device (e.g., first external electronic device 400 of FIG. 2) located in the first direction (direction ①) and/or the array antenna AR. For example, the electronic device 600 may start the communication protocol after searching for the external electronic device (e.g., first external electronic device 400 of FIG. 2) through the first wireless communication method (e.g., Bluetooth communication method) through the patch antenna P, and may send and receive data to and from the external electronic device (e.g., first external electronic device 400 of FIG. 2) through the second wireless communication method (e.g., 802.11ay communication method) through the array antenna AR.

Figure 10B:
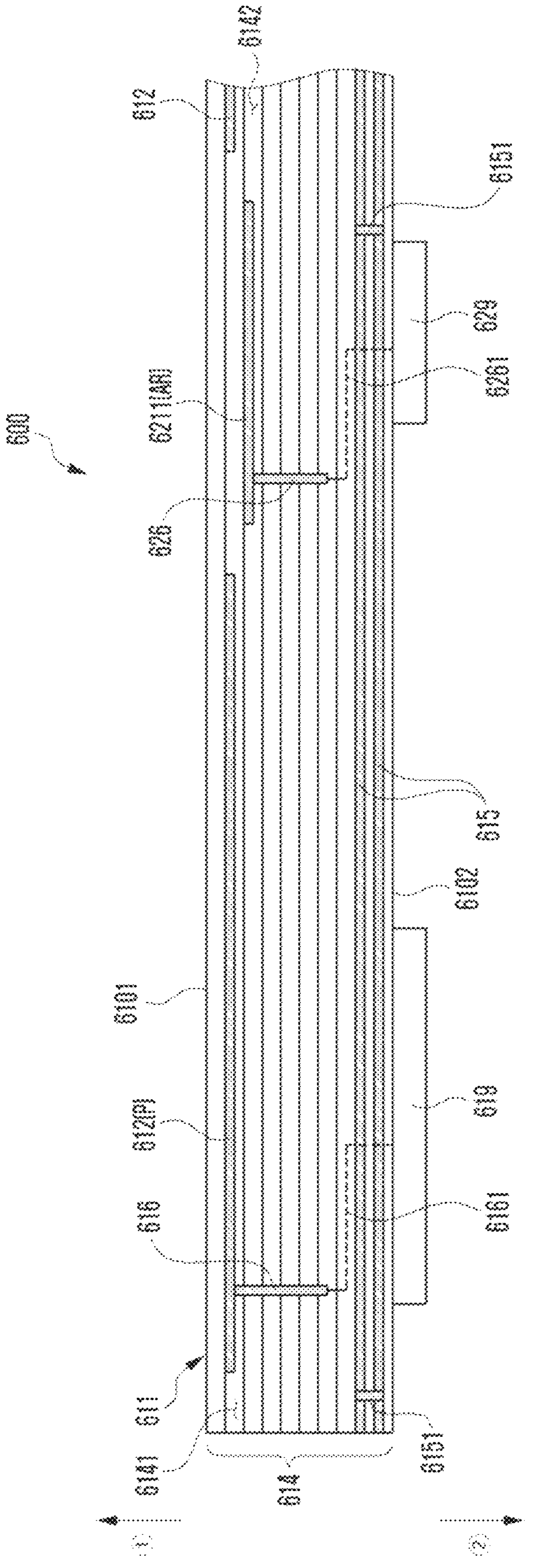
Figure 10C:
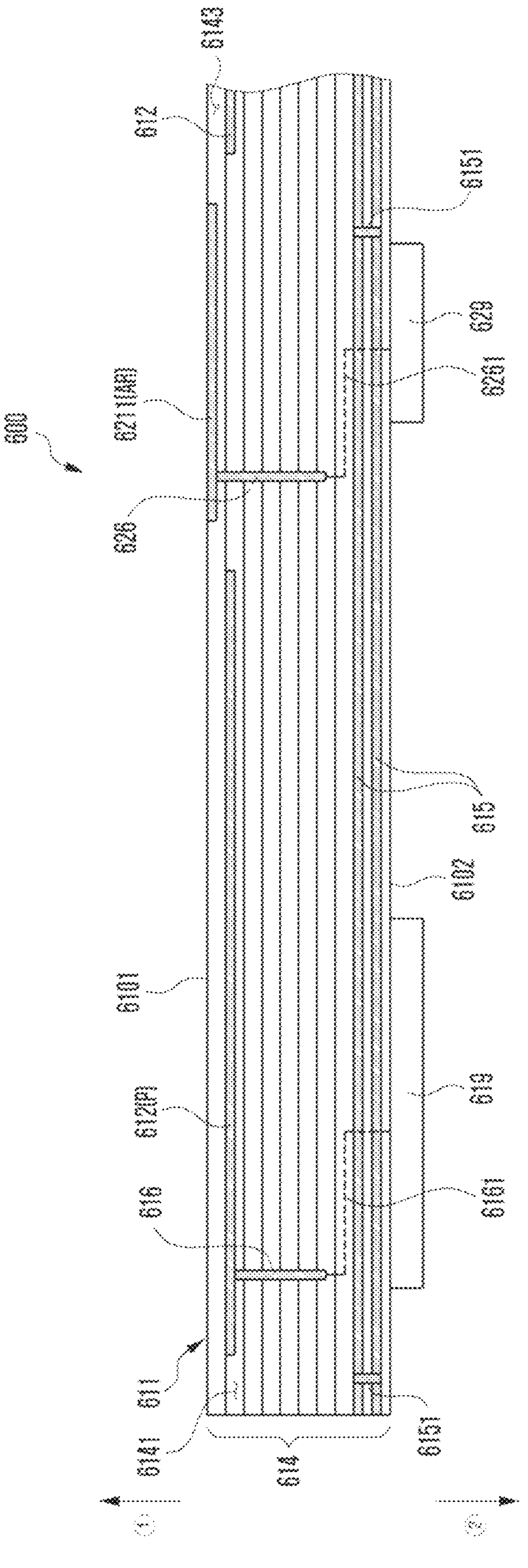
Figure 10D:
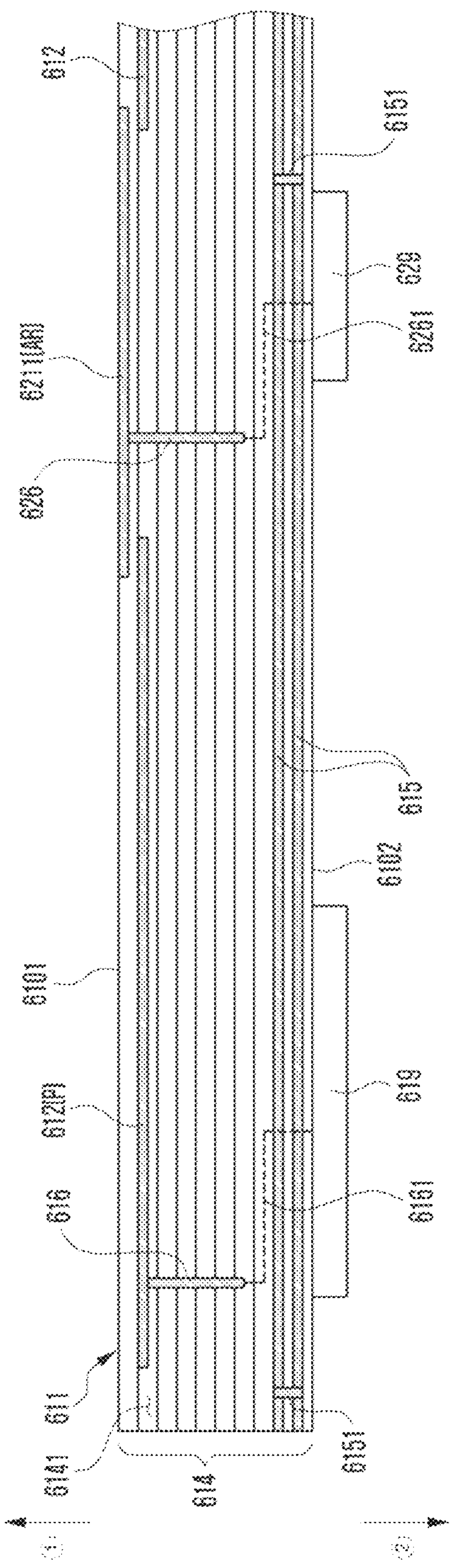

In explaining the constituent elements of the electronic device 600 of FIGS. 10B and 10D, the same reference numerals are given to substantially the same constituent elements as the constituent elements illustrated in FIG. 10A, and the detailed explanation thereof may be omitted.

With reference to FIG. 10B, the array antenna AR may be disposed on the second insulating layer 6142 being farther from the first substrate surface 6101 than the first insulating layer 6141 on which the conductive patch 612 is disposed.

With reference to FIG. 10C, the array antenna AR may be disposed on the third insulating layer 6143 being closer to the first substrate surface 6101 than the first insulating layer 6141 on which the conductive patch 612 is disposed.

With reference to FIG. 10D, the array antenna AR may be disposed at the location where the array antenna AR overlaps at least a part of the patch antenna 612 on the insulating layer that is different from the first insulating layer 6141 on which the conductive patch 612 is disposed when the first substrate surface 6101 is viewed from above. For example, the array antenna AR may be disposed on the second insulating layer 6142 or the third insulating layer 6143 among the plurality of insulting layers 614.

According to various embodiments, an electronic device (e.g., electronic device 300 of FIG. 3) may include: a housing (e.g., housing 301 and 302 of FIG. 3); a first antenna structure (e.g., first antenna structure 310 of FIG. 6) disposed in an inner space (e.g., inner space 3001 of FIG. 3) of the housing, the first antenna structure including: a first substrate (PCB) (e.g., first substrate 311 of FIG. 6) including a first substrate surface (e.g., first substrate surface 3101 of FIG. 6), a second substrate surface (e.g., second substrate surface 3102 of FIG. 6) being opposite to the first substrate surface, a plurality of first insulating layers (e.g., plurality of first insulating layers 314 of FIG. 6) disposed between the first substrate surface and the second substrate surface, and a first ground layer (e.g., first ground layer 315 of FIG. 6) disposed on at least one of the plurality of first insulating layers; and a conductive patch (e.g., conductive patch 312 of FIG. 6) configured to overlap the first ground layer and disposed on any one of the plurality of first insulating layers when the first substrate surface is viewed from above; a second antenna structure (e.g., second antenna structure 320 of FIG. 6) disposed adjacent to the first substrate or in an opening of the first substrate in the inner space, the second antenna structure including: a second substrate (e.g., second substrate 321 of FIG. 6) including a third substrate surface (e.g., third substrate surface 3201 of FIG. 6) directed in the same direction as the direction of the first substrate surface, a fourth substrate surface (e.g., fourth substrate surface 3202 of FIG. 6) directed in the same direction as the direction of the second substrate surface, and a plurality of second insulating layers (e.g., a plurality of second insulating layers 324 of FIG. 6) and a second ground layer (e.g., second ground layer 325 of FIG. 6) disposed between the third substrate surface and the fourth substrate surface; and at least two antenna elements (e.g., antenna element 3211 of FIG. 6) disposed at designated intervals on an insulating layer being closer to the third substrate surface than the fourth substrate surface among the plurality of second insulating layers; a first wireless communication circuit (e.g., first wireless communication circuit 319 of FIG. 6) disposed in the inner space and configured to transmit and/or receive a radio signal of a first frequency band through the conductive patch; and a second wireless communication circuit (e.g., second wireless communication circuit 329 of FIG. 6) disposed in the inner space and configured to transmit and/or receive a radio signal of a second frequency band through the at least two antenna elements, wherein the conductive patch is disposed to at least partly surround the second antenna structure, and wherein a beam coverage of the first antenna structure and a beam coverage of the second antenna structure are configured to overlap each other at least partly.

According to various embodiments, the second frequency band may be configured to be higher than the first frequency band.

According to various embodiments, the first frequency band may be in a range of about 600 MHz to 6000 MHz.

According to various embodiments, the second frequency band may be equal to or higher than about 6 GHz.

According to various embodiments, the conductive patch may be disposed not to overlap the at least two antenna elements when the first substrate surface is viewed from above.

According to various embodiments, the at least two antenna elements may be disposed to be surrounded in a loop shape through the conductive patch when the first substrate surface is viewed from above.

According to various embodiments, the first wireless communication circuit may be disposed on the second substrate surface, and the second wireless communication circuit may be disposed on the second substrate surface or the fourth substrate surface.

According to various embodiments, a first beam coverage of the first antenna structure may include a second beam coverage of the second antenna structure.

According to various embodiments, the first substrate may include an opening (e.g., opening 313 of FIG. 6) formed to be surrounded at least partly through the conductive patch when the first substrate surface is viewed from above, and the second substrate may be disposed inside the opening.

According to various embodiments, an electronic device (e.g., electronic device 300 of FIG. 3 or electronic device 600 of FIG. 10A) may include: a housing (e.g., housings 301 and 302 of FIG. 3); a substrate (e.g., substrate 611 of FIG. 10A) disposed in an inner space (e.g., inner space 3001 of FIG. 3) of the housing, the substrate including: a first substrate surface (e.g., first substrate surface 6101 of FIG. 10A), a second substrate surface (e.g., second substrate surface 6102 of FIG. 10A) being opposite to the first substrate surface, a plurality of insulating layers (e.g., plurality of insulating layers 614 of FIG. 10A) disposed between the first substrate surface and the second substrate surface, and a ground layer (e.g., ground layer 615 of FIG. 10A) disposed on at least one of the plurality of insulating layers; a patch antenna (e.g., patch antenna 612 of FIG. 10A) configured to overlap the ground layer and disposed on a first insulating layer (e.g., first insulating layer 6141 of FIG. 10A) among the plurality of insulating layers when the first substrate surface is viewed from above; an array antenna (e.g., array antenna AR of FIG. 10A) configured to overlap the ground layer and disposed on any one of the plurality of insulating layers when the first substrate surface is viewed from above; a first wireless communication circuit (e.g., first wireless communication circuit 619 of FIG. 10A) disposed in the inner space and configured to transmit and/or receive a radio signal of a first frequency band through the patch antenna; and a second wireless communication circuit (e.g., second wireless communication circuit 629 of FIG. 10A) disposed in the inner space and configured to transmit and/or receive a radio signal of a second frequency band through the array antenna, wherein the array antenna is disposed to be surrounded in a loop form through the patch antenna when the first substrate surface is viewed from above, and wherein a beam coverage of the patch antenna and a beam coverage of the array antenna are configured to overlap each other at least partly.

According to various embodiments, the second frequency band may be configured to be higher than the first frequency band.

According to various embodiments, the first frequency band may be in a range of 600 MHz to 6000 MHz.

According to various embodiments, the second frequency band may be equal to or higher than 6 GHz.

According to various embodiments, the array antenna may be disposed on the first insulating layer.

According to various embodiments, the array antenna may be disposed on an insulating layer being closer to the ground layer than the first insulating layer or being farther from the ground layer than the first insulating layer.

According to various embodiments, when the first substrate surface is viewed from above, the array antenna may not overlap the patch antenna, or may be disposed to overlap the patch antenna at least partly.

According to various embodiments, the array antenna may be disposed to be surrounded in a closed-loop form through the patch antenna when the first substrate surface is viewed from above.

According to various embodiments, the first wireless communication circuit and/or the second wireless communication circuit may be disposed on the second substrate surface.

According to various embodiments, a first effective beam coverage of the patch antenna may include a second beam coverage of the array antenna.

According to various embodiments, the array antenna may include at least two conductive patches or conductive patterns disposed at designated intervals on any one of the plurality of insulating layers of the substrate.

Embodiments of the disclosure that are described in the specification and shown in drawings are merely for ease of explanation of the technical contents of the embodiments of the disclosure and proposal of specific examples to help understanding of the embodiments of the disclosure, but are not intended to limit the scope of the embodiments of the disclosure. Accordingly, it should be construed that all changes or modifications derived based on the technical concept of the various embodiments of the disclosure are included in the scope of the various embodiments of the disclosure in addition to the embodiments disclosed herein.

What is claimed is:

1. An electronic device comprising:

a housing;

a first antenna structure provided in an inner space of the housing, the first antenna structure comprising:

a first substrate having a first substrate surface facing a first direction and a second substrate surface facing a second direction opposite to the first direction, the first substrate comprising a plurality of first insulating layers and a first ground layer disposed on at least one of the plurality of first insulating layers; and a conductive patch disposed on one of the plurality of first insulating layers and overlapping the first ground layer when the first substrate surface is viewed from above;

a second antenna structure disposed near the first substrate in the inner space of the housing, the second antenna structure comprising:

a second substrate having a third substrate surface facing the first direction and a fourth substrate surface facing the second direction, the second substrate comprising a plurality of second insulating layers that are stacked and a second ground layer; and at least two antenna elements disposed on a second insulating layer, among the plurality of second insulating layers, that is closer to the third substrate surface than the fourth substrate surface, wherein the conductive patch at least partly surrounds the second antenna structure.

2. The electronic device of claim 1, further comprising a first wireless communication circuit disposed in the inner space of the housing and configured to transmit or receive a radio signal of a first frequency band through the conductive patch; and a second wireless communication circuit is disposed in the inner space and is configured to transmit or receive a radio signal of a second frequency band through the at least two antenna elements, wherein a beam coverage of the first antenna structure and a beam coverage of the second antenna structure overlap each other at least partly.

3. The electronic device of claim 2, wherein the second frequency band is higher than the first frequency band.

4. The electronic device of claim 2, wherein the first frequency band is in a range of 600 MHz to 6000 MHz.

5. The electronic device of claim 2, wherein the second frequency band is equal to or higher than 6 GHz.

6. The electronic device of claim 2, wherein the first wireless communication circuit is disposed on the second substrate surface, and wherein the second wireless communication circuit is disposed on the second substrate surface or the fourth substrate surface.

7. The electronic device of claim 1, wherein the conductive patch does not overlap the at least two antenna elements when the first substrate surface is viewed from above.

8. The electronic device of claim 1, wherein the at least two antenna elements are surrounded in a loop shape by the conductive patch when the first substrate surface is viewed from above.

9. The electronic device of claim 1, wherein a first beam coverage of the first antenna structure comprises a second beam coverage of the second antenna structure.

10. The electronic device of claim 1, wherein the first substrate comprises an opening formed to be at least partly surrounded by the conductive patch when the first substrate surface is viewed from above, and wherein the second substrate is disposed inside the opening.

11. An electronic device comprising:

a housing;

a substrate disposed in an inner space of the housing, the substrate comprising:

a plurality of insulating layers that are stacked, and a ground layer disposed on at least one of the plurality of insulating layers;

a patch antenna overlapping the ground layer and disposed on a first insulating layer among the plurality of insulating layers; and an array antenna overlapping the ground layer and disposed on an insulating layer among the plurality of insulating layers, wherein the array antenna is surrounded in a loop form by the patch antenna.

12. The electronic device of claim 11, further comprising:

a first wireless communication circuit disposed in the inner space and configured to transmit or receive a radio signal of a first frequency band through the patch antenna; and a second wireless communication circuit disposed in the inner space and configured to transmit or receive a radio signal of a second frequency band through the array antenna, wherein a beam coverage of the patch antenna and a beam coverage of the array antenna at least partly overlap each other.

13. The electronic device of claim 12, wherein the second frequency band be higher than the first frequency band.

14. The electronic device of claim 12, wherein the first frequency band is in a range of 600 MHz to 6000 MHz.

15. The electronic device of claim 12, wherein the second frequency band is equal to or higher than 6 GHz.

16. The electronic device of claim 11, wherein the array antenna is disposed on the first insulating layer.

17. The electronic device of claim 11, wherein the array antenna is disposed on an insulating layer, among the plurality of insulating layers, that is closer to the ground layer than the first insulating layer, or on an insulating layer, among the plurality of insulating layers, that is farther from the ground layer than the first insulating layer.

* * * * *